(12) United States Patent
Hashimoto et al.

(10) Patent No.: US 9,677,454 B2
(45) Date of Patent: Jun. 13, 2017

(54) GASKET

(71) Applicant: HONDA MOTOR CO., LTD., Tokyo (JP)

(72) Inventors: Akinori Hashimoto, Wako (JP); Takahiro Shinkai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 14/322,066

(22) Filed: Jul. 2, 2014

(65) Prior Publication Data

US 2015/0008649 A1    Jan. 8, 2015

(30) Foreign Application Priority Data

Jul. 4, 2013    (JP) .................................. 2013-141025

(51) Int. Cl.
*F01N 13/18*        (2010.01)
*F16J 15/08*        (2006.01)
(Continued)

(52) U.S. Cl.
CPC ........ *F01N 13/1827* (2013.01); *F16J 15/061* (2013.01); *F16J 15/0818* (2013.01);
(Continued)

(58) Field of Classification Search
CPC .... F16J 15/061; F16J 15/0806; F16J 15/0818; F16J 15/0825; F16J 15/085;
(Continued)

(56) References Cited

U.S. PATENT DOCUMENTS 4,120,156 A * 10/1978 McInerney ........... F02B 37/183
                                                  415/144
4,463,564 A *  8/1984 McInerney ........... F01D 17/105
                                                  137/892
(Continued)

FOREIGN PATENT DOCUMENTS

DE        43 25 346 C2     2/1994
DE        43 25 346 C2     7/1998
(Continued)

OTHER PUBLICATIONS

"Replacing Wastegate Actuator" PassatWorld, published Aug. 29, 2005-Sep. 1, 2005, available: http://www.passatworld.com/forums/b5-garage/191818-replacing-wastegate-actuator.html.*
(Continued)

*Primary Examiner* — Nicholas L Foster
(74) *Attorney, Agent, or Firm* — Squire Patton Boggs (US) LLP

(57) ABSTRACT

A gasket is provided that can effectively alleviate stresses arising therein when at high temperatures. A substantially annular gasket 1 used in coupling an outlet 30 of a turbocharger 3; the gasket 1 includes a gasket face 10 that is an abutting face of the gasket 1 that abuts a flange 31 when the gasket is in a state fitted to the flange 31 of an outlet 30; and the gasket face 10 is an annular shape having the plurality of fastener holes 11A, 13A, 15A and 17A, and in an area between one fastener hole and another fastener hole, the width of a portion H that reaches the highest temperature by exhaust gas channeled by the W/G valve 5 impinging thereon is formed to be the narrowest, and the width gradually increases as approaching towards the one fastener hole or the other fastener hole from the portion.

13 Claims, 7 Drawing Sheets

(51) Int. Cl.
  *F16J 15/06* (2006.01)
  *F02F 11/00* (2006.01)
(52) U.S. Cl.
  CPC ............ *F02F 11/00* (2013.01); *F16J 15/0825* (2013.01); *F16J 2015/0868* (2013.01)
(58) Field of Classification Search
  CPC .................. F16J 15/0868; F16J 15/0887; F16J 2015/0868; F05D 2240/55; F02C 7/28; F01D 11/005; F02F 11/00; F04D 29/102; F02B 37/183; F01N 13/1827
  See application file for complete search history.

(56) References Cited

U.S. PATENT DOCUMENTS

| | | | |
|---|---|---|---|
| 5,456,578 A | 10/1995 | Honda et al. | |
| 8,418,459 B2* | 4/2013 | Finkbeiner | F01D 9/023 60/321 |
| 2002/0050138 A1* | 5/2002 | Deacon | F02B 37/183 60/602 |
| 2006/0131817 A1* | 6/2006 | Kerelchuk | F16J 15/0825 277/592 |
| 2007/0216109 A1* | 9/2007 | Friedow | F01N 13/1827 277/593 |
| 2008/0143060 A1* | 6/2008 | Casler | F16J 15/0818 277/654 |
| 2009/0072495 A1* | 3/2009 | Kullen | F16J 15/0887 277/630 |
| 2010/0005798 A1* | 1/2010 | Finkbeiner | F01D 9/023 60/597 |
| 2012/0210709 A1* | 8/2012 | Cizek | F01D 17/105 60/602 |
| 2012/0304952 A1* | 12/2012 | Perrin | F01D 17/141 123/188.2 |
| 2014/0165555 A1* | 6/2014 | Marques | F02B 37/18 60/602 |
| 2014/0333034 A1* | 11/2014 | Janthur | F16J 15/0825 277/594 |
| 2015/0076771 A1* | 3/2015 | Stout | B21D 13/00 277/595 |
| 2015/0121863 A1* | 5/2015 | Micanek | F02B 37/183 60/605.1 |

FOREIGN PATENT DOCUMENTS

| | | |
|---|---|---|
| DE | 20 2006 014 072 U1 | 11/2006 |
| JP | 62-018321 A | 1/1987 |
| JP | 07-189723 A | 7/1995 |
| JP | 4760633 B2 | 8/2011 |
| WO | 2013 011342 A1 | 1/2013 |

OTHER PUBLICATIONS

German Search Report application No. 102014212811.0 mailed on Jul. 8, 2015.

* cited by examiner

GASKET

This application is based on and claims the benefit of priority from Japanese Patent Application No. 2013-141025, filed on 4 Jul. 2013, the content of which is incorporated herein by reference.

BACKGROUND OF THE INVENTION

Field of the Invention

The present invention relates to a gasket. In more detail, the present invention relates to a gasket used in the coupling of exhaust system components of an internal combustion engine.

Related Art

Conventionally, in the coupling of exhaust system components of an internal combustion engine, a great variety of shapes of gaskets are being used (for example, refer to Patent Documents 1 to 3). Usually, stresses such as tensile stress arise in the gaskets used in the coupling of exhaust system components of internal combustion engines, from exposing to high temperature and thermally deforming. For this reason, it has been desired for gaskets to be designed in a structure so as to alleviate the stresses arising when at high temperatures, with the object of avoiding breakage from stress.

[Patent Document 1] Japanese Patent No. 4760633
[Patent Document 2] Japanese Unexamined Patent Application, Publication No. S62-18321
[Patent Document 3] Japanese Unexamined Patent Application, Publication No. H07-189723

SUMMARY OF THE INVENTION

However, the exhaust gas of an internal combustion engine is channeled according to the shape of the exhaust flow channel and components provided inside the exhaust flow channel. For this reason, upon designing a gasket to be arranged at a position at which channeled high-temperature exhaust gas directly impinges, high-temperature exhaust gas most greatly affects any part of the gasket, whereby it is necessary to make a design making consideration of what kind of stresses arise. However, such a consideration has not been made conventionally, a result of which, the current situation is that stresses arising when at high temperatures cannot be effectively alleviated.

The present invention has been made taking the above into account, and an object thereof is to provide a gasket that can effectively alleviate stresses arising when at high temperatures.

In order to achieve the above-mentioned object, the present invention provides an annular gasket (e.g., the gasket 1 described later) used in coupling exhaust system components (e.g., the outlet 30 of the turbocharger 3 described later) of an internal combustion (e.g., the engine described later), includes a plurality of fastener holes (e.g., the fastener holes 11A, 13A, 15A and 17A described later), in which the gasket is disposed on a downstream side of a channeling part (e.g., the W/G valve 5 described later) that causes exhaust gas to flow unevenly; the gasket includes a gasket face (e.g., the gasket face 10 described later) that is an abutting face of the gasket that abuts a flange (e.g., the flange 31 described later) when the gasket is in a state fitted between flanges of the exhaust system components; and the gasket face is an annular shape having a plurality of fastener holes (e.g., the fastener holes 11A, 13A, 15A and 17A described later), and in an area between one fastener hole and another fastener hole, the width of a portion (e.g., the portion H described later) that reaches the highest temperature by exhaust gas channeled by the channeling part impinging thereon is formed to be the narrowest, and the width gradually increases as approaching towards the one fastener hole or the other fastener hole from the portion.

In the present invention, the gasket is arranged on a downstream side of the channeling part that channels exhaust gas. In addition, in the state fitting the gasket to the flange of the exhaust system component, the gasket face abutting this flange is configured so that, in the area between one fastener hole and another fastener hole, the width of the portion which reaches the highest temperatures by exhaust gas channeled by channeling part impinging thereon is the narrowest, and the width gradually increases approaching towards one fastener hole or another fastener hole from this portion.

According to the gasket of the present invention, since the width of the portion exposed to the highest temperatures is made the narrowest, it is possible to minimize the amount of thermal distortion of the material in this portion. In addition, since the width is made to gradually increase approaching towards the fastener holes from the portion exposed to the highest temperatures, it is possible to raise the rigidity in the vicinity of the fastener hole, and thus the deformation due to stresses caused at the fastener hole can be suppressed. Therefore, according to the present invention, stresses arising when at high temperature can be effectively alleviated and thus the amount of thermal distortion can be suppressed; therefore, the gasket having high sealing properties and high durability is obtained.

It is preferable for the gasket to be configured from austenitic iron alloy, and the flange of the exhaust system components to be configured from ferritic iron alloy.

In the present invention, the gasket is configured from austenitic iron alloy, and the flange of the exhaust system component abutted by the gasket is configured from ferritic iron alloy.

In the case of configuring the gasket with the same ferritic iron alloy as the flange of the exhaust system component as is conventionally, for example, although it is possible to suppress the occurrence of stresses when at high temperatures, adequate sealing property will not be obtained. For this reason, in this case, it is necessary to coat a coating material (e.g., moisture dispersant containing boron nitride, sodium silicate, etc.) between the gasket and flange of the exhaust system component. In addition, since this coating material solidifies like an adhesive when heat is applied with the passing of time, it is necessary to remove the solidified coating material upon performing maintenance. Furthermore, in this case, since it is necessary to raise the rigidity of the flange compared to a case of not using a coating material, as a result, the weight of the flange increases.

To address this, conventionally, in the case of configuring a gasket from austenitic iron alloy, which has higher elasticity than ferritic iron alloy, there has been concern over great stresses arising when at high temperatures; however, since stresses can be effectively alleviated as mentioned above according to the present invention, the aforementioned effects of the invention are remarkably exhibited. In addition, as characteristics of austenitic iron alloy, sealing properties higher than conventionally are obtained without using a coating material. Furthermore, a coating material is unnecessary, and thus a shortening of the maintenance time, reduction in cost and reduction in flange weight are possible.

It is preferable for the channeling part to be configured by a valve (for example, the W/G valve 5 described later).

In the present invention, the channeling part is configured by a valve.

Usually, exhaust gas is greatly channeled by a valve such as a waste gate (W/G) valve or EGR valve provided in the exhaust system. For this reason, with the present invention, high-temperature exhaust gas is greatly channeled by a valve, and the channeled exhaust gas intensively impinges between the fastener holes of the gasket arranged on the downstream side; therefore, the aforementioned problem occurs obviously. Therefore, according to the present invention, the aforementioned effects of the respective inventions are more reliably exhibited compared to a case such as configuring the channeling part by a curved part of the exhaust flow channel, for example.

According to the present invention, it is possible to provide a gasket that can effectively alleviate stresses arising when at high temperatures.

DETAILED DESCRIPTION OF THE INVENTION

Hereinafter, an embodiment of the present invention will be explained in detail while referencing the drawings.

The gasket according to the embodiment of the present invention is used in the coupling of the outlet of a turbocharger, serving as an exhaust system component of an internal combustion engine (hereinafter referred to as "engine"). The gasket according to the present embodiment is arranged on a downstream side of a waste gate valve (hereinafter referred to as W/G valve) as a channeling part that causes the exhaust gas discharged from the engine to flow unevenly.

Figure 1A:
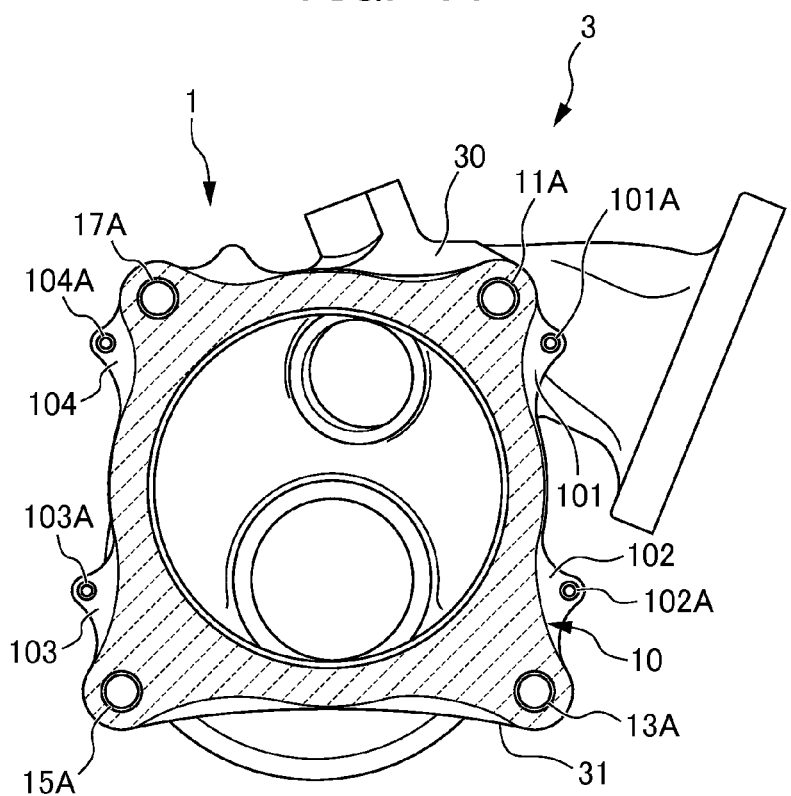
FIG. 1A provides views showing a state in which a gasket according to an embodiment of the present invention has been fitted to the flange of the outlet of a turbocharger, with being a view seen from the outlet side.

FIG. 1A provides views showing a state in which a gasket 1 according to the present embodiment has been fitted to a flange 31 of outlet 30 of a turbocharger 3, with being a view seen from the outlet side.

Figure 1B:
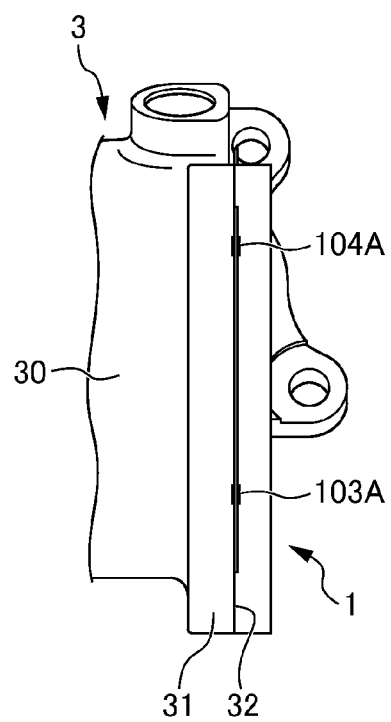
FIG. 1B provides views showing a state in which a gasket according to an embodiment of the present invention has been fitted to the flange of the outlet of a turbocharger, with being a side view.

FIG. 1B provides views showing a state in which a gasket 1 according to the present embodiment has been fitted to a flange 31 of outlet 30 of a turbocharger 3, with being a side view.

A shown in FIG. 1A and FIG. 1B, the gasket 1 is fitted to the flange 31 of the outlet 30 of the turbocharger 3. In more detail, the gasket 1 is mounted on a flange face 32 of the flange 31 formed at the opening edge of the outlet 30 of the turbocharger 3, by making so that four fastener holes 11A, 13A, 15A and 17A formed in the gasket 1 overlap four fastener holes formed in the flange 31.

It should be noted that the gasket 1 is sandwiched between a flange formed at the opening edge of an exhaust pipe that is not illustrated and the above-mentioned flange 31.

In this regard, with the present embodiment, the abutting face of the gasket 1 abutting the flange 31 in a state in which the gasket 1 is fitted to the flange 31 is defined as a gasket face 10. In FIG. 1A, the shaded area indicates the gasket face 10. The gasket face 10, in the case of using a plurality of gaskets 1 by bundling, for example, indicates the face contributing to the sealing of exhaust gas, excluding rivet parts 101, 102, 103, 104, etc. at which rivets 101A, 102A, 103A and 104A are formed for positioning and fastening the gaskets 1.

In the present embodiment, the flange 31 of the outlet 30 of the turbocharger 3 is configured from ferritic iron alloy. In contrast, differing from the flange 31, the gasket 1 is configured from austenitic iron alloy.

Ferritic iron alloy has a characteristic of stresses not easily arising when at high temperatures, while the sealing property is poor. In contrast, austenitic iron alloy has a characteristic of having superior sealing property, while having high elasticity and stresses tending to arise when at high temperatures.

It should be noted that, iron and steel, SUS, etc. are exemplified as the iron alloys, for example.

Figure 2:
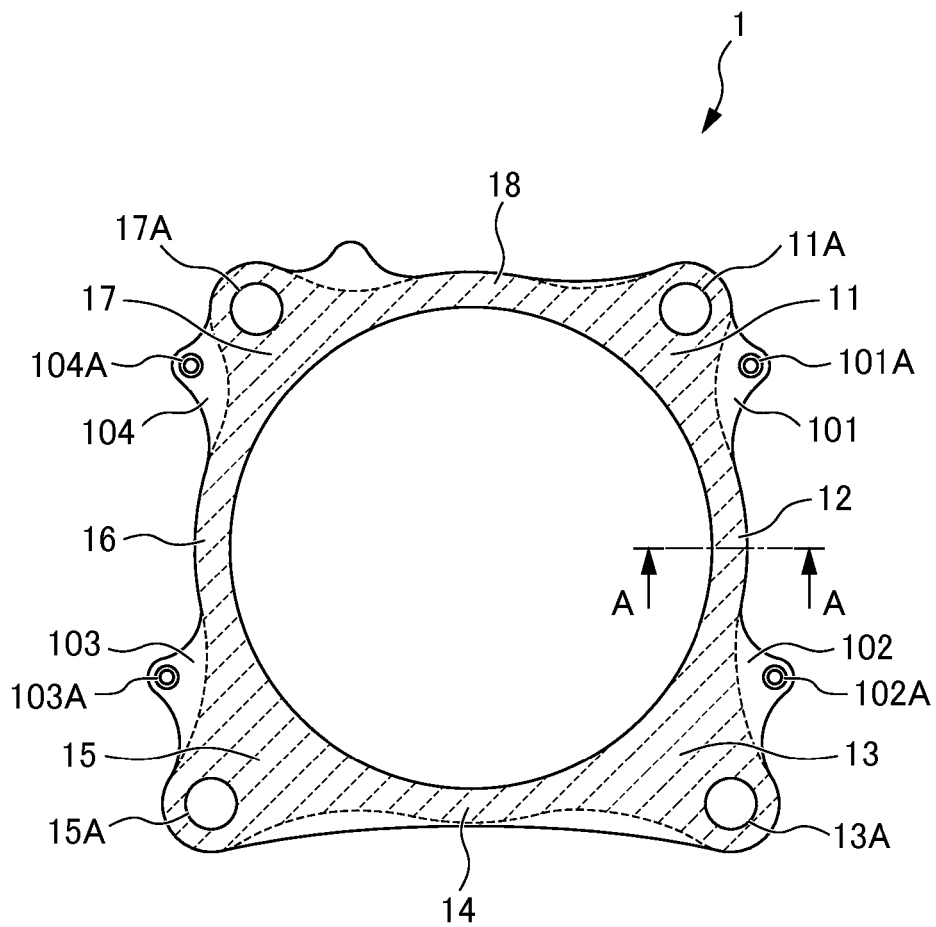
FIG. 2 is a plan view of the gasket according to the embodiment.

FIG. 2 is a plan view of the gasket 1 according to the present embodiment.

As shown in FIG. 2, the gasket 1 has a substantially annular shape. The gasket 1 has the fastener holes 11A, 13A, 15A and 17A provided at substantially equal intervals in the circumferential direction.

The gasket face 10 defined as above is configured by a fastener hole part 11 in the vicinity of the fastener hole 11A, a fastener hole part 13 in the vicinity of the fastener hole 13A, a fastener hole part 15 in the vicinity of the fastener hole 15A, a fastener hole part 17 in the vicinity of the fastener hole 17A, an intermediate part 12 between the fastener hole part 11 and the fastener hole part 13, an intermediate part 14 between the fastener hole part 13 and the fastener hole part 15, an intermediate part 16 between the fastener hole part 15 and the fastener hole part 17, and an intermediate part 18 between the fastener hole part 11 and the fastener hole part 17.

The gasket 1 according to the present embodiment has a characteristic of, in the area between one fastener hole part and another fastener hole part, the width of a portion that reaches the highest temperature by exhaust gas channeled by the W/G valve serving as the channeling part impinging thereon, being formed to be the narrowest.

More specifically, the gasket 1 is formed so that a substantially central portion in the circumferential direction of each of the intermediate parts 12, 14, 16 and 18 has the narrowest width.

In addition, the gasket 1 according to the present embodiment has a characteristic of being formed so that, approaching from a substantially central portion in the circumferential direction of each of the intermediate parts 12, 14, 16 and 18 towards the fastener holes 11A, 13A, 15A and 17A, respectively, the width gradually increases.

The reason for adopting the above characteristic configuration will be described in detail at a later stage.

Figure 3:
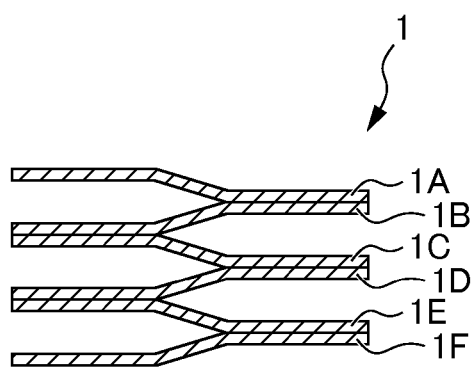
FIG. 3 is a cross-sectional view along the line A-A in FIG. 2.

FIG. 3 is a cross-sectional view along the line A-A in FIG. 2.

As shown in FIG. 3, the gasket 1 according to the present embodiment bundles a total of 6 gaskets 1A to 1E, which are fastened to each other by way of rivets 101A, 102A, 103A and 104A. In addition, in each of the gaskets 1A to 1E, sloped parts are alternately formed in the laminating direction to slope to opposite sides from an outer portion towards an inner portion in the cross-sectional view. Between adjacent gaskets, a predetermined gap is formed at either the outside or inside alternately.

Next, the distribution of stresses arising within the gasket when at high temperatures will be explained.

Figure 4A:
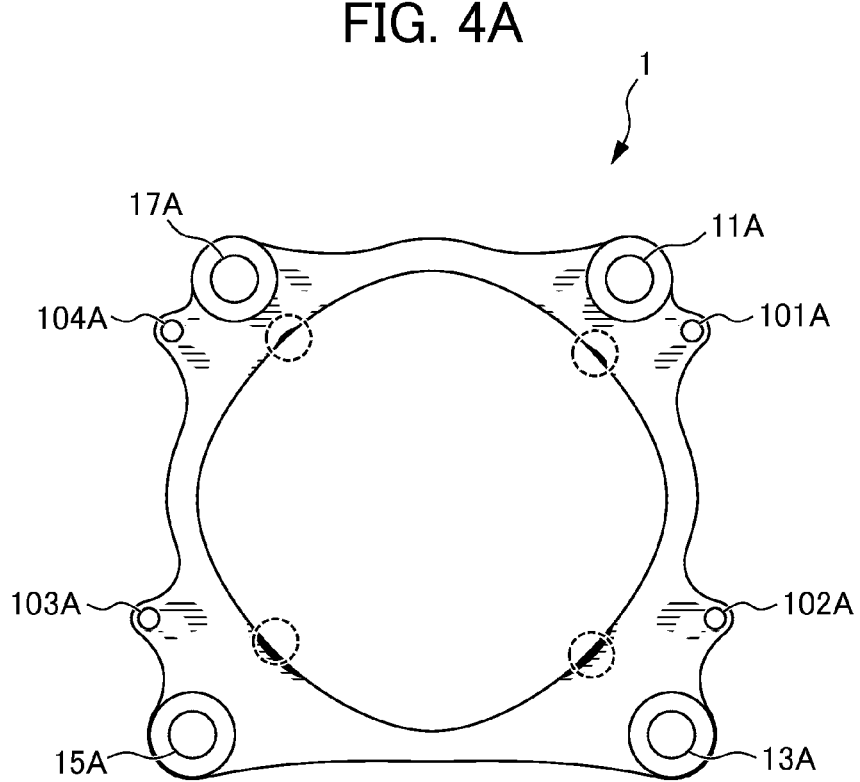
FIG. 4A provides views showing a distribution of stresses arising within the gasket when at high temperatures, with being a view showing the stress distribution of the gasket according to the embodiment.
Figure 4B:
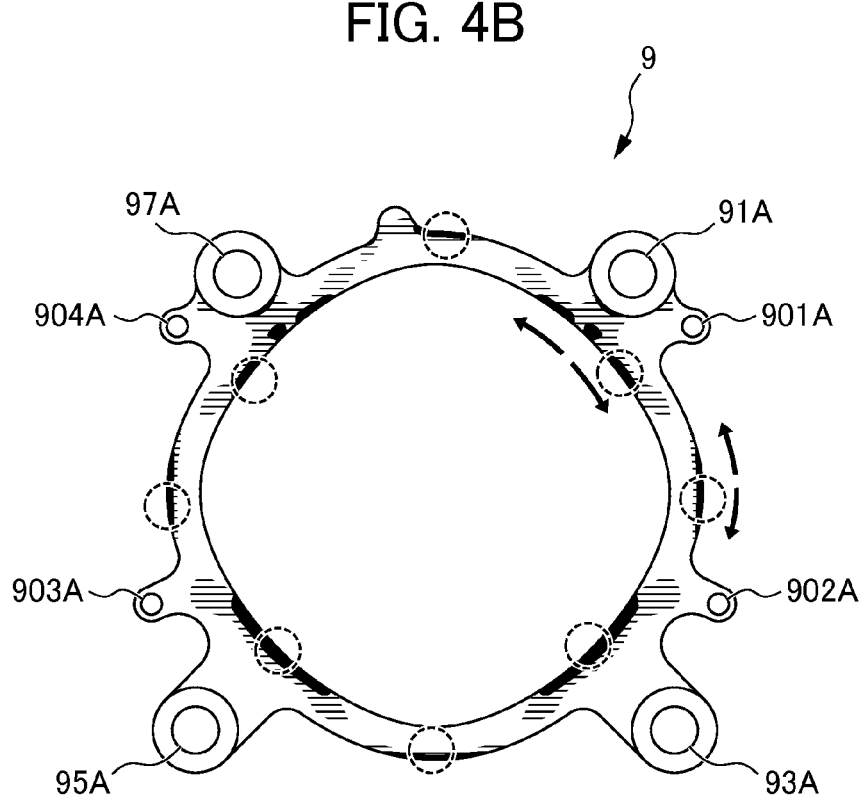
FIG. 4B provides views showing a distribution of stresses arising within the gasket when at high temperatures, with being a view showing the stress distribution of a conventional gasket.

FIG. 4A provides views showing a distribution of stresses arising within the gasket when at high temperatures, with being a view showing the stress distribution of the gasket 1 according to the present embodiment. FIG. 4B provides views showing a distribution of stresses arising within the gasket when at high temperatures, with being a view showing the stress distribution of a conventional gasket 9. It should be noted that the gasket 9 is fitted to the flange 31 of the outlet 30 of the turbocharger 3, similarly to the gasket 1. In addition, FIGS. 4A and 4B show the stresses increasing for darker portions.

As shown by the dotted circles in FIG. 4B, with the conventional gasket 9, it is found that high stresses occur at the gasket inside in the vicinity of fastener holes 91A, 93A, 95A and 97A, and at the gasket outside between the fastener holes 91A, 93A, 95A and 97A. This is from the elongation of the material constituting the gasket 9 differing between the inside and outside.

In more detail, a tensile stress occurs at the outside of the gasket 9, by the vicinities of the fastener holes 91A, 93A, 95A and 97A, having a low rate of restriction, i.e. deforming the easiest, deforming. Next, accompanying this, the inside of the gasket 9 also deforms, whereby tensile stress occurs in the vicinities of the fastener holes 91A, 93A, 95A and 97A.

At this time, deformation at the inside of the gasket 9 in the vicinities of the fastener holes 91A, 93A, 95A and 97A is deformation in a direction separating from the vicinities of the fastener holes 91A, 93A, 95A and 97A (refer to arrows in FIG. 4B).

The deformation at the outside of the gasket 9 between the fastener holes 91A, 93A, 95A and 97A is deformation in a direction approaching the fastener holes 91A, 93A, 95A and 97A from the vicinity of the middle between the fastener holes 91A, 93A, 95A and 97A (refer to arrows in FIG. 4B).

From the above results, it is found that it is possible to alleviate stress by taking consideration of the locations of the fastener holes of a gasket and adjusting the gasket width so as to suppress the deformation amount.

Next, the relationship between the W/G position and flange temperature will be explained.

Figure 5:
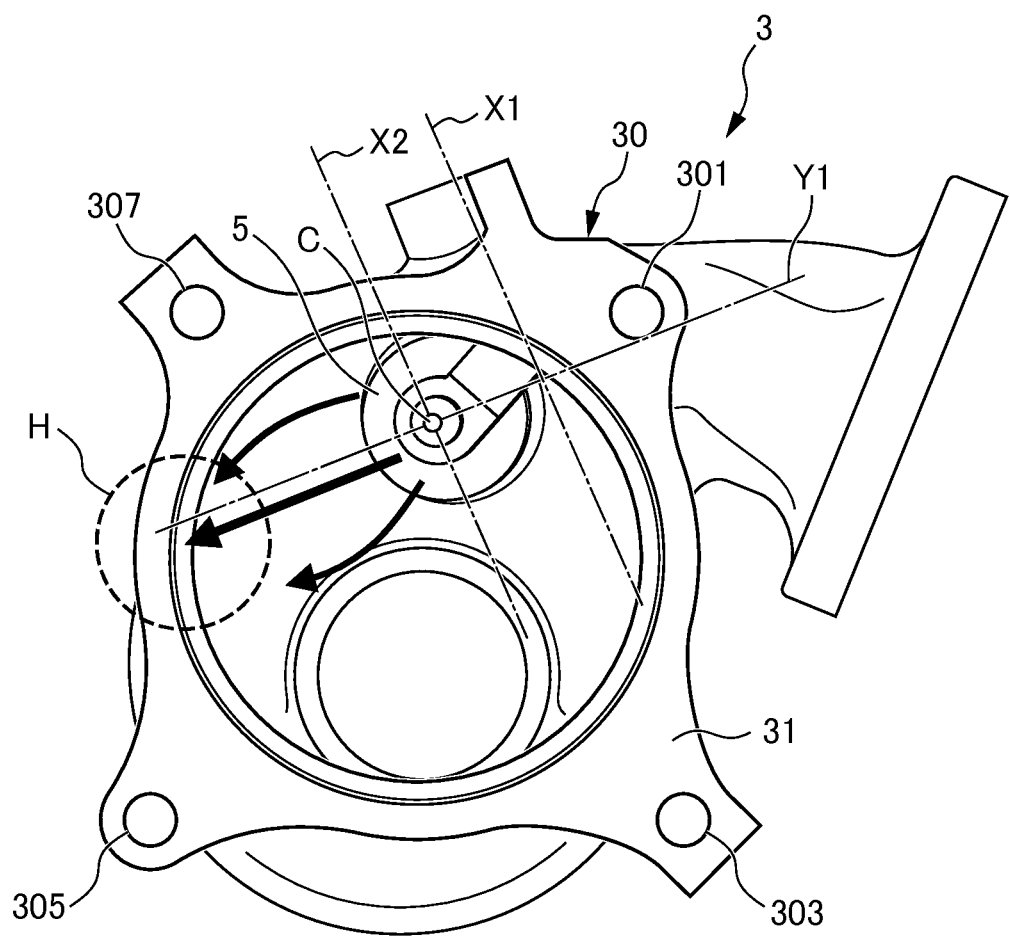
FIG. 5 is a view observing the outlet of the turbocharger from the outlet side.

FIG. 5 is a view observing the outlet 30 of the turbocharger 3 from the outlet side. As shown in FIG. 5, the W/G valve 5 is provided to the outlet 30 of the turbocharger 3. The W/G valve 5 is opened and closed in a direction perpendicular to the page of the drawing, about a W/G valve shaft axis X1, the aperture thereof being about 20°.

High-temperature exhaust gas impinges the most focused on the side to which the W/G valve 5 opens, at a portion H (portion inside dotted circle in FIG. 5) at which the flange 31 intersects with a line Y1 orthogonal to a line X2 that is parallel to the W/G valve shaft axis X1 and passes through the center C of the W/G valve 5. Therefore, this portion H is exposed to the highest temperatures.

Figure 6:
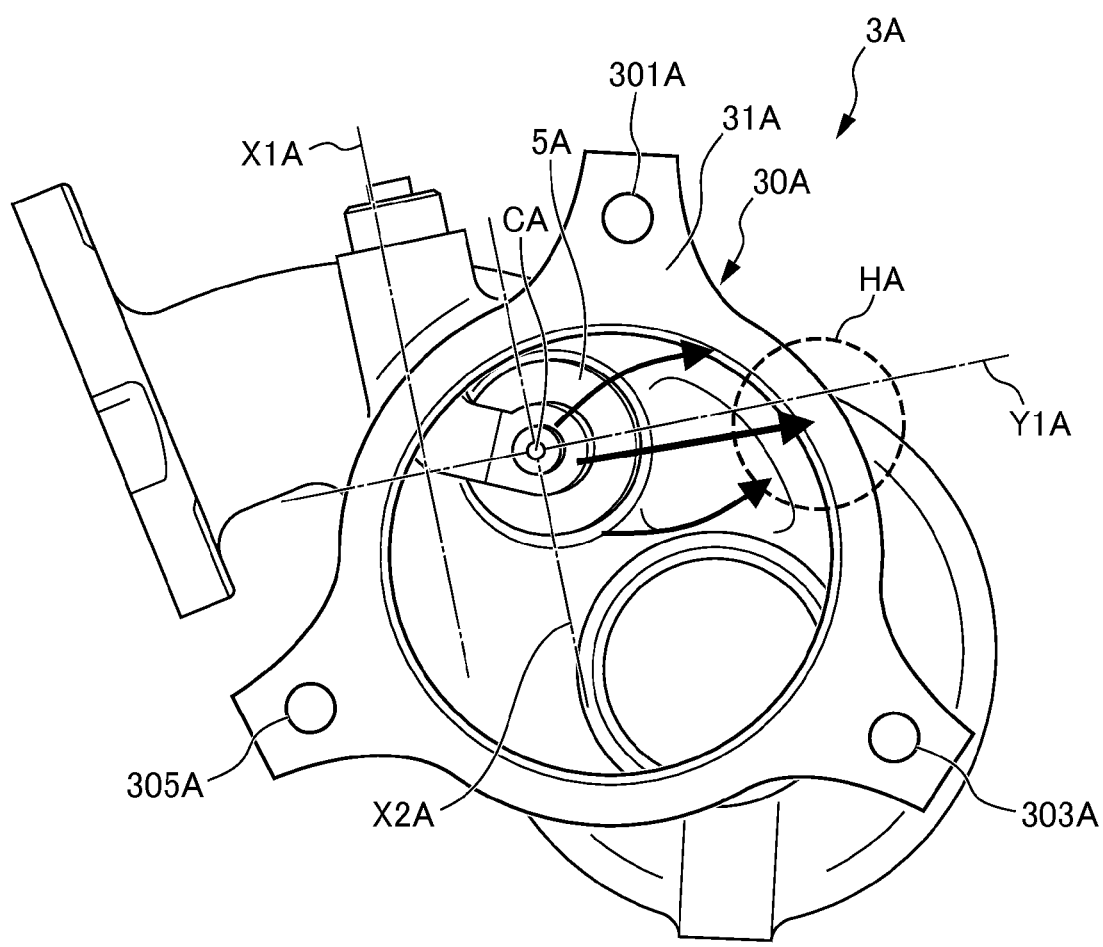
FIG. 6 is a view observing the outlet of another turbocharger from the outlet side.

FIG. 6 is a cross-sectional view observing the outlet 30A of another turbocharger 3A from the outlet side. The outlet 30A of the turbocharger 3A has basically the same configuration as the outlet 30 of the turbocharger 3, but differs in orientation, dimensions, etc. In this turbocharger 3A, high-temperature exhaust gas is also the most concentrated to impinge on a portion HA (portion within dotted circle in FIG. 6), for the same reason as described above, and thus this portion HA is exposed to the highest temperature.

Figure 7:
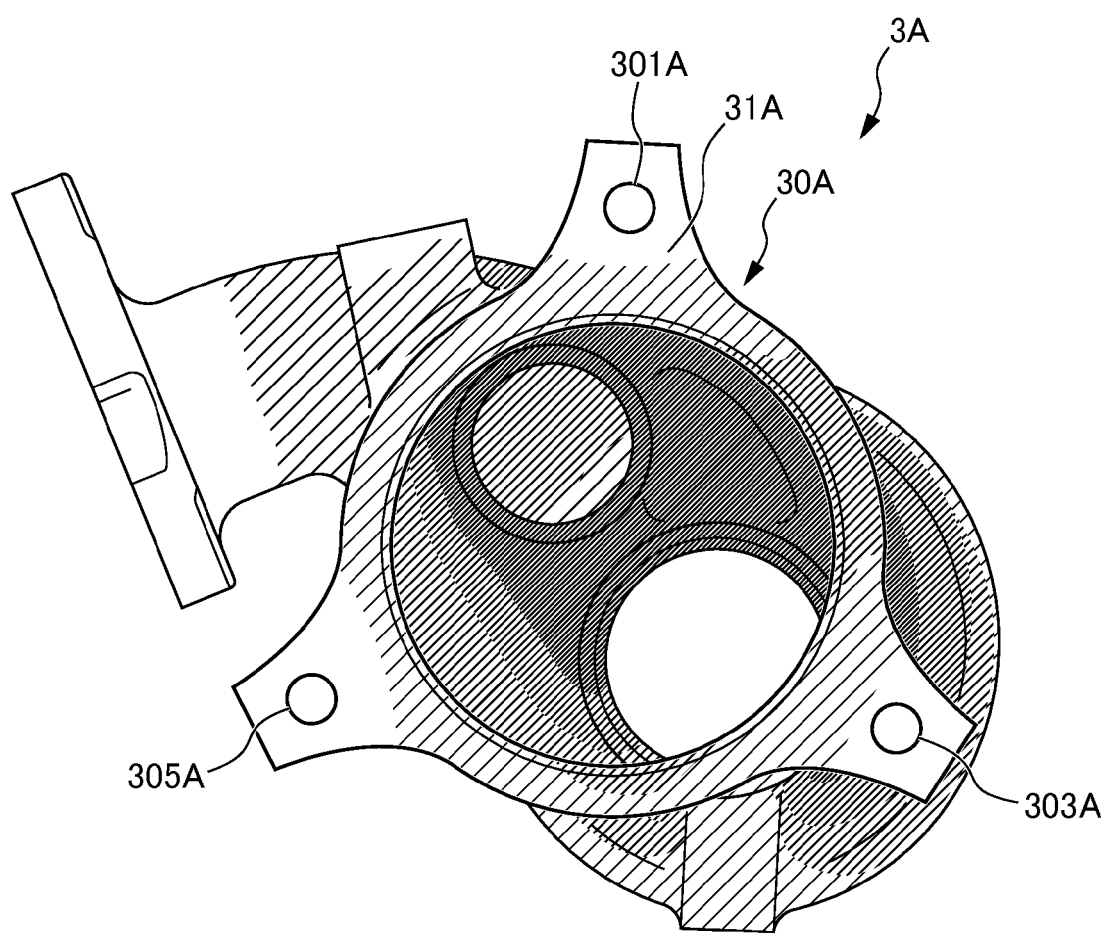
FIG. 7 is a view showing the temperature distribution of the outlet of another turbocharger.

Herein, FIG. 7 is a view showing the temperature distribution at the outlet 30A of the other turbocharger 3A. FIG. 7 indicates higher temperatures as darker portions. As is evident when comparing FIG. 6 and FIG. 7, it is confirmed that the portion HA is exposed to the highest temperatures.

From this result, it is confirmed that the portion H is exposed to the highest temperature also in the outlet 30 of the turbocharger 3.

From the above results, it is found that it is best to design in a shape causing the width of the gasket 1 to vary taking consideration of the tensile stress occurring when at high temperatures and the temperature distribution presumed from the position of the W/G valve 5. However, it is necessary to design so that the portion H exposed to the highest temperatures is between fastener holes, and in the present embodiment, the portion H exposed to the highest temperatures is arranged at substantially a central portion in the circumferential direction of the intermediate part 16.

Therefore, according to the gasket 1 according to the present embodiment illustrated in FIG. 4A, which was designed by taking account of the foregoing, it is found that the stresses arising within the gasket 1 when at high temperatures are more greatly alleviated than conventionally. In other words, it is found that, by the gasket 1 according to the present embodiment having a characteristic of the substantially central portions in the circumferential direction of the respective intermediate portions 12, 14 and 18 being formed to have the narrowest width in addition to the substantially central part in the circumferential direction of the intermediate portion 16 corresponding to the portion H exposed to the highest temperatures, and a characteristic of the width gradually increasing as approaching the respective fastener holes 11A, 13A, 17A and 17A from the substantially central portions in the circumferential direction of the respective intermediate parts 12, 14, 16 and 18, the stresses arising within the gasket 1 when at high temperatures are alleviated more greatly than conventionally.

The following effects are exerted according to the present embodiment.

In the present embodiment, the gasket 1 is arranged on a downstream side of the W/G valve 5 that channels exhaust gas. In addition, in the state fitting the gasket 1 to the flange 31 of the outlet 30 of the turbocharger 3, the gasket face 10 abutting this flange 31 is an annular shape having the four fastener holes 11A, 13A, 15A and 17A, and is configured so that, in the area between one fastener hole and another fastener hole, the width of the portion H which reaches the highest temperatures by exhaust gas channeled by the W/G valve 5 impinging thereon is the narrowest, and the width gradually increases approaching towards one fastener hole or another fastener hole from this portion H.

According to the gasket 1 of the present embodiment, since the width of the portion H exposed to the highest temperatures is made the narrowest, it is possible to minimize the amount of thermal distortion of the material in this portion H. In addition, since the width is made to gradually increase approaching towards the fastener holes from the portion H exposed to the highest temperatures, it is possible to raise the rigidity in the vicinity of the fastener hole, and thus the deformation due to stresses caused at the fastener hole can be suppressed. Therefore, according to the present embodiment, stresses arising when at high temperature can be effectively alleviated and thus the amount of thermal distortion can be suppressed; therefore, the gasket 1 having high sealing properties and high durability is obtained.

In addition, with the present embodiment, the gasket 1 is configured from austenitic iron alloy, and the flange 31 of the outlet 30 of the turbocharger 3 abutted by the gasket 1 is configured from ferritic iron alloy.

In the case of configuring the gasket with the same ferritic iron alloy as the flange as is conventionally, for example, although it is possible to suppress the occurrence of stresses when at high temperatures, adequate sealing property will not be obtained. For this reason, in this case, it is necessary to coat a coating material (e.g., moisture dispersant containing boron nitride, sodium silicate, etc.) between the gasket and flange. In addition, since this coating material solidifies like an adhesive when heat is applied with the passing of time, it is necessary to remove the solidified coating material upon performing maintenance. Furthermore, in this case, since it is necessary to raise the rigidity of the flange compared to a case of not using a coating material, as a result thereof, the weight of the flange increases.

To address this, conventionally, in the case of configuring a gasket from austenitic iron alloy, which has higher elasticity than ferritic iron alloy, there has been concern over great stresses arising when at high temperatures; however, since stresses can be effectively alleviated as mentioned above according to the present embodiment, the aforementioned effects are remarkably exhibited. In addition, as characteristics of austenitic iron alloy, sealing properties higher than conventionally are obtained without using a coating material. Furthermore, a coating material is unnecessary, and thus a shortening of the maintenance time, reduction in cost and reduction in flange weight are possible.

In addition, with the present embodiment, the channeling part that channels exhaust gas is configured by the W/G valve 5.

Usually, exhaust gas is greatly channeled by a valve such as a waste gate (W/G) valve or EGR valve provided in the exhaust system. For this reason, with the present embodiment, high-temperature exhaust gas is greatly channeled by a valve, and the channeled exhaust gas intensively impinges between the fastener holes of the gasket arranged on the downstream side; therefore, the aforementioned problem occurs obviously. Therefore, according to the present embodiment, the aforementioned effect is more reliably exhibited compared to a case such as configuring the channeling part by a curved part of the exhaust flow channel, for example.

It should be noted that the present invention is not to be limited to the above-mentioned embodiment, and that modifications, improvements, etc. within a scope that can achieve the objects of the present invention are encompassed by the present invention.

In the above-mentioned embodiment, the exhaust system component is established as the outlet of the turbocharger, and the channeling part is configured by the W/G valve; however, it is not limited thereto.

Figure 8A:
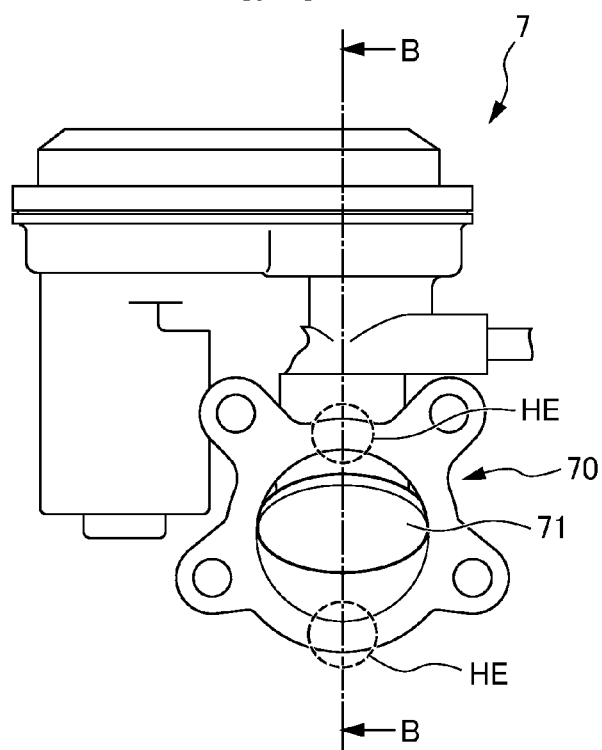
FIG. 8A provides views showing a modified example of the embodiment, with being a view observing an EGR pipe of an EGR device from the front.
Figure 8B:
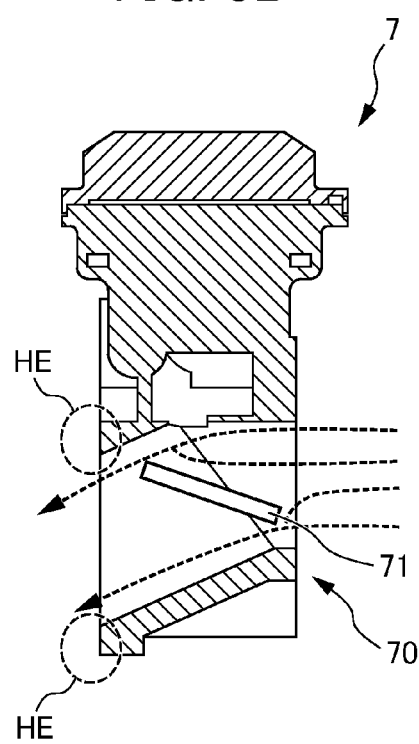
FIG. 8B provides views showing a modified example of the embodiment, with being a lateral cross-sectional view of the EGR pipe of the EGR device.

FIG. 8A provides views showing a modified example of the present embodiment, with being a cross-sectional view observing an EGR pipe 70 an EGR device 7 from the front. FIG. 8B provides views showing a modified example of the present embodiment, with being a lateral cross-sectional view of the EGR pipe 70 of the EGR device 7. As shown in FIGS. 8A and 8B, the exhaust system component may be established as the EGR pipe 70 of the EGR device 7, and the channeling part is configured by an EGR valve 71. In this case, portions HE positioned above and below the EGR valve 71 (dotted circle portions in FIGS. 8A and 8B) are portions exposed to the highest temperatures.

Alternatively, it may be configured with another valve used in another exhaust system component. In addition, the channeling part may be configured by a curved part of the exhaust pipe.

With the above-mentioned embodiment, although the gasket is made a substantially toric shape, it is not limited thereto. It is applicable so long as being annular.

In addition, with the above-mentioned embodiment, the number of fastener holes is established as four; however, it is not limited thereto. The fastener holes may be more numerous than four, or may be fewer than four.

With the above-mentioned embodiment, although six gaskets are used by bundling, the number is not limited. It may be more numerous or fewer than six, or may be one. It is not necessarily a plurality, and so long as the shape of the gasket face abutting the flange of the exhaust system is within the scope of the present invention, any number will be sufficient.

It should be noted that in the case of using only one, rivets for bundling a plurality thereof will be unnecessary.

What is claimed is:

1. An annular gasket used in coupling exhaust system components of an internal combustion engine, the gasket comprising a plurality of fastener holes,
   wherein the gasket is disposed on a downstream side of a channeling part that causes exhaust gas to flow unevenly,
   wherein the gasket includes a gasket face that is an abutting face of the gasket that abuts a flange when the gasket is in a state fitted between flanges of the exhaust system components,
   wherein the gasket face is an annular shape having a plurality of fastener holes around a circumference of the gasket,
   wherein the gasket comprises a plurality of intermediate parts, each being defined as an area of the gasket between respective pairs of the plurality of fastener holes,
   wherein one of the intermediate parts is disposed between one of the pairs of fastener holes and comprises a substantially central portion in a circumferential direction of the one intermediate part, the substantially central portion being located at a portion of the one intermediate part that is about half the distance between the one of the pairs of fastener holes, and the substantially central portion reaching a highest temperature by the exhaust gas channeled by the channeling part impinging thereon, wherein a width in a radial direction of the one intermediate part is formed to be the narrowest in the substantially central portion, the substantially central portion has a substantially constant width, and the width in the radial direction of the one intermediate part gradually increases from the substantially central portion towards each fastener hole of the one of the pairs of fastener holes, wherein an overall length in a circumferential direction of the substantially central portion is about one-third the overall distance between the fastener holes of the one of the pairs of fastener holes, and wherein the configuration of the gasket results in reduced stress and deformation at the fastener holes.

2. The gasket according to claim 1, wherein the gasket comprises austenitic iron alloy, and the flange of the exhaust system component comprises ferritic iron alloy.

3. The gasket according to claim 1, wherein the channeling part comprises a valve.

4. The gasket according to claim 2, wherein the channeling part comprises a valve.

5. The gasket according to claim 1, wherein the gasket further comprises rivets that are disposed at portions excluding the substantially central portion.

6. The gasket according to claim 1, wherein the gasket is a multilayered gasket with layers thereof fastened by way of rivets, and sloped parts are alternately formed in a laminating direction to slope to opposite sides from an outer portion towards an inner portion in a cross-sectional view of the gaskets.

7. A turbocharger of an internal combustion engine, the turbocharger comprising:

an outlet from which exhaust gas is expelled;

an annular gasket coupled to the outlet of the turbocharger of the internal combustion engine, the gasket comprising a plurality of fastening holes; and a waste-gate valve configured to serve as a channeling part and configured to create uneven flow of the exhaust gas discharged from the engine, wherein the gasket is disposed on a downstream side of the waste-gate valve, wherein the gasket includes a gasket face that is an abutting face of the gasket that abuts a flange when the gasket is in a state fitted between flanges of the turbocharger, wherein the gasket face is an annular shape having a plurality of fastener holes around a circumference of the gasket, wherein the gasket comprises a plurality of intermediate parts, each being defined as an area of the gasket between respective pairs of the plurality of fastener holes, wherein one of the intermediate parts is disposed between one of the pairs of fastener holes and comprises a substantially central portion in a circumferential direction of the one intermediate part, the substantially central portion being located at a portion of the one intermediate part that is about half the distance between one of the pairs of fastener holes, and the substantially central portion reaching a highest temperature by the exhaust gas channeled by the channeling part impinging thereon, wherein the substantially central portion comprises an intersecting portion, which is on a side to which the waste-gate, valve opens and at which the flange intersects a straight line orthogonal to a straight line parallel to a shaft axis of the waste-gate valve and passing through a center of the waste-gate valve, wherein the intersecting portion is disposed at the substantially central portion in the circumferential direction of the one intermediate part, wherein a width of the one intermediate part is formed so as to be the narrowest in the substantially central portion, the substantially central portion has a substantially constant width, and the width of the one intermediate part gradually increases from the substantially central portion towards each fastener hole of the one of the pairs of fastener holes, wherein an overall length in a circumferential direction of the substantially central portion is about one-third the overall distance between the fastener holes of the one of the pairs of fastener holes, and wherein the configuration of the gasket results in reduced stress and deformation at the fastener holes.

8. The turbocharger according to claim 7, wherein the gasket further comprises rivets that are disposed at portions excluding the substantially central portion.

9. The gasket according to claim 7, wherein the gasket is a multilayered gasket with layers thereof fastened by way of rivets, and sloped parts are alternately formed in a laminating direction to slope to opposite sides from an outer portion towards an inner portion in a cross-sectional view of the gaskets.

10. A turbocharger of an internal combustion engine, the turbocharger comprising:

an outlet from which exhaust gas is expelled;

an annular gasket coupled to the outlet of the turbocharger of the internal combustion engine, the gasket comprising a plurality of fastening holes; and a waste-gate valve configured to serve as a channeling part and configured to create uneven flow of the exhaust gas discharged from the engine, wherein the gasket is disposed on a downstream side of the waste-gate valve, wherein the gasket includes a gasket face that is an abutting face of the gasket that abuts a flange when the gasket is in a state fitted between flanges of the turbocharger, wherein the gasket face is an annular shape having a plurality of fastener holes around a circumference of the gasket, wherein the gasket comprises a plurality of intermediate parts, each being defined as an area of the gasket between respective pairs of the plurality of fastener holes, wherein one of the intermediate parts is disposed between one of the pairs of fastener holes and comprises a substantially central portion in a circumferential direction of the one intermediate part, the substantially central portion being located at a portion of the one intermediate part that is about half the distance between the one of the pairs of fastener holes, and the substantially central portion reaching a highest temperature by the exhaust gas channeled by the channeling part impinging thereon, wherein the substantially central portion comprises an intersecting portion, which is on a side to which the waste-gate valve opens and at which the flange intersects a straight line orthogonal to a straight line parallel to a shaft axis of the waste-gate valve and passing through the center of the waste-gate valve, wherein the intersecting portion is disposed at the substantially central portion in the circumferential direction of the one intermediate part, wherein a width of the one intermediate part is formed so as to be the narrowest in the substantially central portion, the width of the one intermediate part gradually increases from the substantially central portion towards each fastener hole of the one of the pairs of fastener holes, and wherein the substantially central portion has a substantially constant width, wherein an overall length in a circumferential direction of the substantially central portion is about one-third the overall distance between the fastener holes of the one of the pairs of fastener holes, and wherein the configuration of the gasket results in reduced stress and deformation at the fastener holes.

11. The turbocharger according to claim 10, wherein the gasket further comprises rivets that are disposed at portions excluding the substantially central portion.

12. The gasket according to claim 10, wherein the gasket a multilayered gasket with layers thereof fastened by way of rivets, and sloped parts are alternately formed in a laminating direction to slope to opposite sides from an outer portion towards an inner portion in a cross-sectional view of the gaskets.

13. A turbocharger of an internal combustion engine, the turbocharger comprising:

an outlet from which exhaust gas is expelled;

an annular gasket coupled to the outlet of the turbocharger of the internal combustion engine, the gasket comprising a plurality of fastening holes; and a waste-gate valve configured to serve as a channeling part and configured to create uneven flow of the exhaust gas discharged from the engine, wherein the gasket is disposed on a downstream side of the waste-gate valve, wherein the gasket includes a gasket face that is an abutting face of the gasket that abuts a flange when the gasket is in a state fitted between flanges of the turbocharger, wherein the gasket face is an annular shape having a plurality of fastener holes around a circumference of the gasket, wherein the gasket comprises a plurality of intermediate parts, each being defined as an area of the gasket between respective pairs of the plurality of fastener holes, wherein one of the intermediate parts is disposed between one of the pairs of fastener holes and comprises a substantially central portion in a circumferential direction of the one intermediate part, the substantially central portion being located at a portion of the one intermediate part that is about half the distance between the one of the pairs of fastener holes, and the substantially central portion reaching a highest temperature by the exhaust gas channeled by the channeling part impinging thereon, wherein the substantially central portion comprises an intersecting portion, which is on a side to which the waste-gate valve opens and at which the flange intersects a straight line orthogonal to a straight line parallel to a shaft axis of the waste-gate valve and passing through the center of the waste-gate valve, wherein the intersecting portion is disposed at the substantially central portion in the circumferential direction of the one intermediate part, wherein a width of the one intermediate part is formed so as to be the narrowest in the substantially central portion, the substantially central portion has a substantially constant width, and the width in the radial direction of the one intermediate part gradually increases from the substantially central portion towards each fastener hole of the one of the pairs of fastener holes, wherein an overall length in a circumferential direction of the substantially central portion is about one-third the overall distance between the fastener holes of the one of the pairs of fastener holes, and wherein the configuration of the gasket results in reduced stress and deformation at the fastener holes.

* * * * *